(12) United States Patent
Philbin et al.

(10) Patent No.: US 9,836,641 B2
(45) Date of Patent: Dec. 5, 2017

(54) GENERATING NUMERIC EMBEDDINGS OF IMAGES

(71) Applicant: Google Inc., Mountain View, CA (US)

(72) Inventors: James William Philbin, Santa Monica, CA (US); Gerhard Florian Schroff, Santa Monica, CA (US); Dmitry Kalenichenko, Marina del Ray, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/972,670

(22) Filed: Dec. 17, 2015

(65) Prior Publication Data
US 2016/0180151 A1    Jun. 23, 2016

Related U.S. Application Data

(60) Provisional application No. 62/093,199, filed on Dec. 17, 2014.

(51) Int. Cl.
| | |
|---|---|
| *G06K 9/00* | (2006.01) |
| *G06K 9/62* | (2006.01) |
| *G06N 3/08* | (2006.01) |
| *G06K 9/46* | (2006.01) |
| *G06K 9/66* | (2006.01) |

(52) U.S. Cl.
CPC ....... *G06K 9/00288* (2013.01); *G06K 9/4619* (2013.01); *G06K 9/6218* (2013.01); *G06K 9/6256* (2013.01); *G06K 9/6267* (2013.01); *G06K 9/66* (2013.01); *G06N 3/08* (2013.01); *G06T 2207/20081* (2013.01); *G06T 2207/20084* (2013.01)

(58) Field of Classification Search
CPC ............. G06K 9/00288; G06K 9/6267; G06K 9/6218; G06T 7/0022; G06T 2207/20081
USPC ....................................................... 382/118
See application file for complete search history.

(56) References Cited

U.S. PATENT DOCUMENTS

| | | | |
|---|---|---|---|
| 2011/0170781 A1 | 7/2011 | Bronstein et al. | |
| 2013/0290222 A1* | 10/2013 | Gordo | G06F 17/30247 706/12 |

OTHER PUBLICATIONS

Rowley et al: "Neural network-based face detection", IEEE, 1996.*
(Continued)

*Primary Examiner* — Ruiping Li
(74) *Attorney, Agent, or Firm* — Fish & Richardson P.C.

(57) ABSTRACT

Methods, systems, and apparatus, including computer programs encoded on computer storage media, for generating numeric embeddings of images. One of the methods includes obtaining training images; generating a plurality of triplets of training images; and training a neural network on each of the triplets to determine trained values of a plurality of parameters of the neural network, wherein training the neural network comprises, for each of the triplets: processing the anchor image in the triplet using the neural network to generate a numeric embedding of the anchor image; processing the positive image in the triplet using the neural network to generate a numeric embedding of the positive image; processing the negative image in the triplet using the neural network to generate a numeric embedding of the negative image; computing a triplet loss; and adjusting the current values of the parameters of the neural network using the triplet loss.

18 Claims, 3 Drawing Sheets

(56) References Cited

OTHER PUBLICATIONS

Lin et al: "Face recognition/detection by probabilistic decision-based neural network", IEEE, 1997.*
Lin et al., "Network in network," arXiv:1312.4400v3, Mar. 4, 2014, pp. 1-10.
Szegedy et al., "Going deeper with convolutions," arXiv:1409.4842v1 [cs.CV], Sep. 17, 2014, pp. 1-12.
International Search Report and Written Opinion in International Application No. PCT/US2015/066466, dated Apr. 18, 2016, 14 pages.
Lai et al., "Simultaneous feature learning and hash coding with deep neural networks," 2015 IEEE Conference on Computer Vision and Pattern Recognition (CVPR), Jun. 1, 2015, pp. 3270-3278, XP055263332.
Parkhi et al., "Deep Face Recognition," Proceedings of the British Machine Vision Conference 2015, Sep. 7, 2015, pp. 1-12, XP055263346.
Schroff et al, "FaceNet: A unified embedding for face recognition and clustering," 2015 IEEE Conference on Computer Vision and Pattern Recognition (CVPR), IEEE, Jun. 7, 2015, pp. 815-823, XP032793492.
Sermanet et al., "OverFeat: Integrated Recognition, Localization and Detection using Convolutional Networks," Feb. 24, 2014, pp. 1-16, XP055263422.
Sun et al., "Deeply learned face representations are sparse, selective, and robust," arXiv:1412.1265v1 [cs.CV], Dec. 2014, pp. 1-12.
Taigman et al., "Deepface: Closing the gap to human-level performance in face verification," In IEEE Conf. on CVPR, Jun. 2014, pp. 1701-1708.
Wang et al., "Learning Fine-Grained Image Similarity with Deep Ranking," 2014 IEEE Conference on Computer Vision and Pattern Recognition, Apr. 17, 2014, pp. 1386-1393, XP055263324.

* cited by examiner

GENERATING NUMERIC EMBEDDINGS OF IMAGES

CROSS-REFERENCE TO RELATED APPLICATION

This application claims priority to U.S. Provisional Application No. 62/093,199, filed on Dec. 17, 2014. The disclosure of the prior application is considered part of and is incorporated by reference in the disclosure of this application.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to one or more other layers in the network, e.g., the next hidden layer, the output layer, or both. Each layer of the network generates an output from a received input in accordance with current values of a respective set of parameters.

Convolutional neural networks are neural networks that include one or more convolutional layers. Convolutional layers are generally sparsely-connected neural network layers. That is, each node in a convolutional layer receives an input from a portion of, i.e., less than all of, the nodes in the preceding neural network layer or, if the convolutional layer is the lowest layer in the sequence, a portion of an input to the neural network, and produces an activation from the input. Generally, convolutional layers have nodes that produce an activation by convolving received inputs in accordance with a set of weights for each node. In some cases, nodes in a convolutional layer may be configured to share weights. That is, all of or a portion of the nodes in the layer may be constrained to always have the same weight values as the other nodes in the layer. Convolutional layers are generally considered to be well-suited for processing images because of their ability to extract features from an input image that depend on the relative location of the pixel data in the input image.

SUMMARY

In general, one innovative aspect of the subject matter described in this specification can be embodied in methods that include the actions of obtaining a plurality of training images, wherein the training images have been classified as images of objects of a particular object type; generating a plurality of triplets of training images, wherein each of the triplets comprises a respective anchor image, a respective positive image, and a respective negative image, and wherein, for each triplet, the anchor image and the positive image have both been classified as images of the same object of the particular object type and the negative image has been classified as an image of a different object of the particular object type; and training a neural network on each of the triplets to determine trained values of a plurality of parameters of the neural network, wherein the neural network is configured to receive an input image of an object of the particular object type and to process the input image to generate a numeric embedding of the input image, wherein training the neural network comprises, for each of the triplets: processing the anchor image in the triplet using the neural network in accordance with current values of the parameters of the neural network to generate a numeric embedding of the anchor image; processing the positive image in the triplet using the neural network in accordance with the current values of the parameters of the neural network to generate a numeric embedding of the positive image; processing the negative image in the triplet using the neural network in accordance with the current values of the parameters of the neural network to generate a numeric embedding of the negative image; computing a triplet loss from the numeric embedding of the anchor image, the positive image, and the negative image; and adjusting the current values of the parameters of the neural network using the triplet loss.

The foregoing and other embodiments can each optionally include one or more of the following features, alone or in combination.

The particular object type may be faces of people.

The neural network may be a deep convolutional neural network.

The neural network may be configured to generate a vector of floating point values for the input image.

The method may comprise using the vector of floating point values as the numeric embedding of the input image.

The method may comprise normalizing the vector of floating point values to generate a normalized vector; and using the normalized vector as the numeric embedding of the input image.

The method may comprise normalizing the vector of floating point values to generate a normalized vector; quantizing the normalized vector to generate a quantized vector; and using the quantized vector as the numeric embedding of the input image.

Adjusting the current values of the parameters may comprise adjusting the current values of the parameters to minimize the triplet loss.

The triplet loss may satisfy, for each of the triplets:

$$L = \max(0, \|f(x^a) - f(x^p)\|_2^2 - \|f(x^a) - f(x^n)\|_2^2 + \alpha),$$

wherein $f(x^a)$ is the numeric embedding of the anchor image in the triplet, $f(x^p)$ is the numeric embedding of the positive image in the triplet, $f(x^n)$ is the numeric embedding of the negative image in the triplet, and $\alpha$ is a predetermined value.

The method may further comprise receiving a first image and a second image; processing the first image using the neural network in accordance with the trained values of the parameters of the neural network to determine a numeric embedding of the first image; processing the second image using the neural network in accordance with the trained values of the parameters of the neural network to determine a numeric embedding of the second image; and determining whether the first image and the second image are images of the same object from a distance between the numeric embedding of the first image and the numeric embedding of the second image.

The method may further comprise processing each of a plurality of images using the neural network in accordance with the trained values of the parameters of the neural network to determine a respective numeric embedding of each of the plurality of images; receiving a new image; processing the new image using the neural network in accordance with the trained values of the parameters of the neural network to determine a numeric embedding of the new image; and classifying the new images as being an image of the same object as one or more of the plurality of images from distances between the numeric embedding of the new image and numeric embeddings of images from the plurality of images.

The method may further comprise processing each of a plurality of images using the neural network in accordance with the trained values of the parameters of the neural network to determine a respective numeric embedding of each of the plurality of images; clustering the numeric embedding of the plurality of images into a plurality of clusters; and for each cluster, classifying the images having numeric embeddings that are in the cluster as being images of the same object.

Particular embodiments of the subject matter described in this specification can be implemented so as to realize one or more of the following advantages. Numeric embeddings of objects of a particular object type, e.g., faces of people, can be effectively generated such that the distance between the numeric embeddings of all images of a particular object, independent of imaging conditions, is small, whereas the distance between the numeric embeddings of a pair of images of different objects is large. The numeric embeddings can be generated by training a deep convolutional network to directly optimize the embedding itself, rather than an intermediate bottleneck layer. Triplets used in training the neural network can be effectively selected to decrease training time and improve the accuracy of the embeddings generated by the trained neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
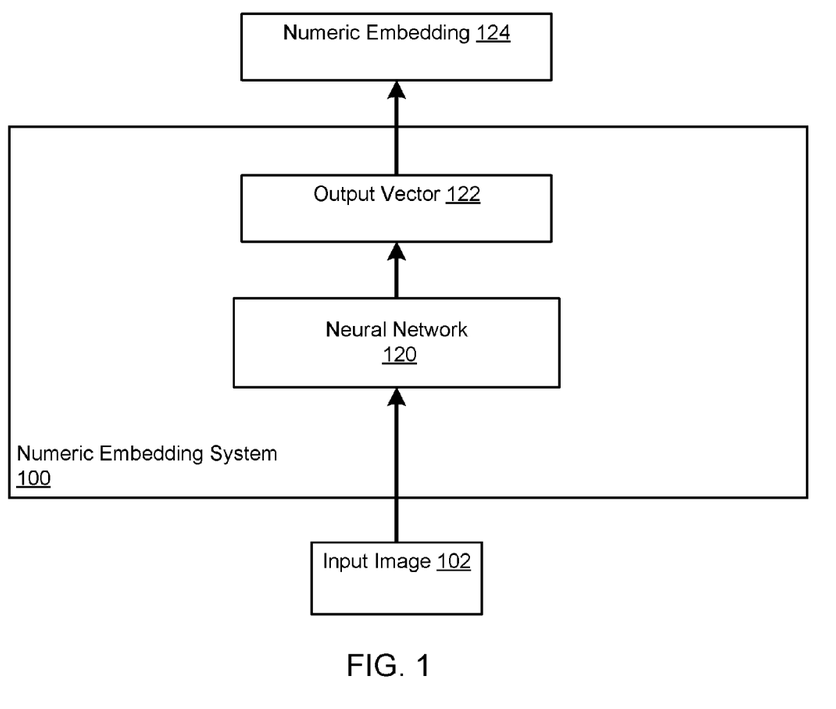
FIG. 1 shows an example numeric embedding system.

FIG. 1 shows an example numeric embedding system 100. The numeric embedding system 100 is an example of a system implemented as computer programs on one or more computers in one or more locations, in which the systems, components, and techniques described below can be implemented.

The numeric embedding system 100 generates numeric embeddings of input images by processing each image using a neural network 120. The input images are images of objects from a particular object type. For example, the particular object type may be faces of people. Thus, in this example, each input image is an image of the face of a person. The numeric embedding of an input image is a numeric representation of the input image, e.g., a Euclidean embedding of the input image.

The neural network 120 is a neural network having multiple parameters, e.g., a deep convolutional neural network, that is configured to receive an input image and to process the input image to generate a fixed-dimensionality vector of numeric values, e.g., of floating point values. An example deep convolutional neural network that can generate such a vector is described in more detail in C. Szegedy, W. Liu, Y. Jia, P. Sermanet, S. Reed, D. Anguelov, D. Erhan, V. Vanhoucke, and A. Rabinovich, *Going deeper with convolutions*, available at http://arxiv.org/pdf/1409.4842. Another example deep convolutional neural network that can generate such a vector is described in more detail in M. Lin, Q. Chen, and S. Yan. *Network in network*, CoRR, abs/1312.4400, 2013.

The numeric embedding system 100 can receive an input image 102 and process the input image 102 using the neural network 120 to generate an output vector 122. In some implementations, the numeric embedding system 100 treats the output vector 122 as a numeric embedding 124 of the input image 102. In some other implementations, the numeric embedding system 100 normalizes, quantizes, or both, the output vector 122 and treats the normalized, quantized or both vector as the numeric embedding 124 of the input image 102.

In order to accurately generate numeric embeddings of input images, the numeric embedding system 100 trains the neural network 120 on training images to determine trained values of the parameters of the neural network 120. The training images are images that have been classified as being images of objects of the particular object type. For example, if the particular object type is faces of people, the training images can include images of the faces of many different people. Training the neural network 120 on the training images is described in more detail below with reference to FIGS. 2-3.

Once the neural network 120 has been trained, the numeric embeddings generated by the numeric embedding system 100 can be used in various image processing tasks.

For example, the numeric embeddings can be used for an image verification task. In this example, the numeric embedding system 120 receives two input images of objects of the particular object type. The numeric embedding system 120 processes each of the input images using the neural network 120 in order to generate a respective numeric embedding of each of the two images. The numeric embedding system 120 then compares the numeric embeddings of the two images to determine whether the two images are of the same object. For example, the numeric embedding system 120 may determine that the two images are of the same object when the distance between the numeric embeddings of the two images is less than a threshold distance.

As another example, the numeric embeddings can be used for an image recognition task. In this example, the numeric embedding system 120 processes each image in a set of multiple images of objects of the particular object type using the neural network 120 to determine a respective numeric embedding of each of the images. The numeric embedding system 120 then receives a new image and processes the new image using the neural network 120 to determine a numeric embedding of the new image. The numeric embedding system 120 then determines whether the new image is an image of the same object as any of the images in the set of multiple images by comparing the numeric embedding of the new image with the numeric embeddings of the images in the set of images. For example, the numeric embedding system 120 can determine that the new image is an image of the same object as another image in the set of images if the distance between the numeric embedding of the new image and the numeric embedding of the other image is less than a threshold distance.

As another example, the numeric embeddings can be used for an image clustering task. In this example, the numeric embedding system 120 processes each image in a set of multiple images of objects of the particular object type using the neural network 120 to determine a respective numeric embedding of each of the images. The numeric embedding system 120 then clusters the numeric embeddings into multiple clusters, e.g., using a conventional clustering technique. The numeric embedding system 120 then determines, for each cluster, that the images whose embeddings are in the cluster are images of the same object and, optionally, that two images whose embeddings are in different clusters are images of different objects.

Figure 2:
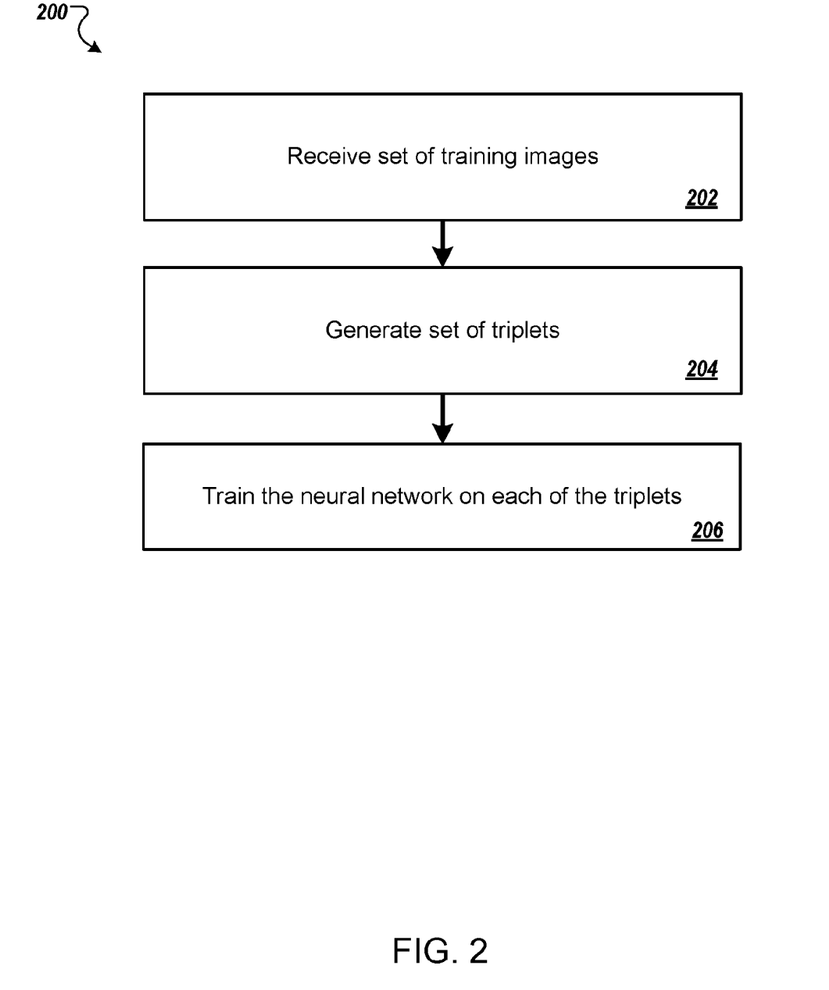
FIG. 2 is a flow diagram of an example process for generating classification data for a structured document.

FIG. 2 is a flow diagram of an example process 200 for training a neural network to generate numeric embeddings. For convenience, the process 200 will be described as being performed by a system of one or more computers located in one or more locations. For example, a numeric embedding system, e.g., the numeric embedding system 100 of FIG. 1, appropriately programmed, can perform the process 200.

The system receives a set of training images (step 202). The training images in the set of training images are images that have been classified as being images of objects from the particular object type. For example, when the particular object type is faces, the training images are various images that have been classified as being images of the faces of various people.

The system generates a set of triplets from the set of training images (step 204). Each triplet includes a respective anchor image, a respective positive image, and a respective negative image. In particular, for each triplet, the anchor image and the positive image are images that have both been classified as being images of the same object of the particular object type, e.g., as images of the face of the same person. The negative image is an image that has been classified as being an image of a different object of the particular object type from the anchor image and the positive image, e.g., an image of the face of a different person.

The system trains the neural network on each of the triplets to determine trained values of the parameters of the neural network (step 208). The system trains the neural network on the triplets to adjust the values of the parameters of the neural network so that the distance between the numeric embeddings of all images of a particular object is small, whereas the distance between the numeric embeddings of a pair of images of different objects is large. Training the neural network on a triplet is described below with reference to FIG. 3.

Figure 3:
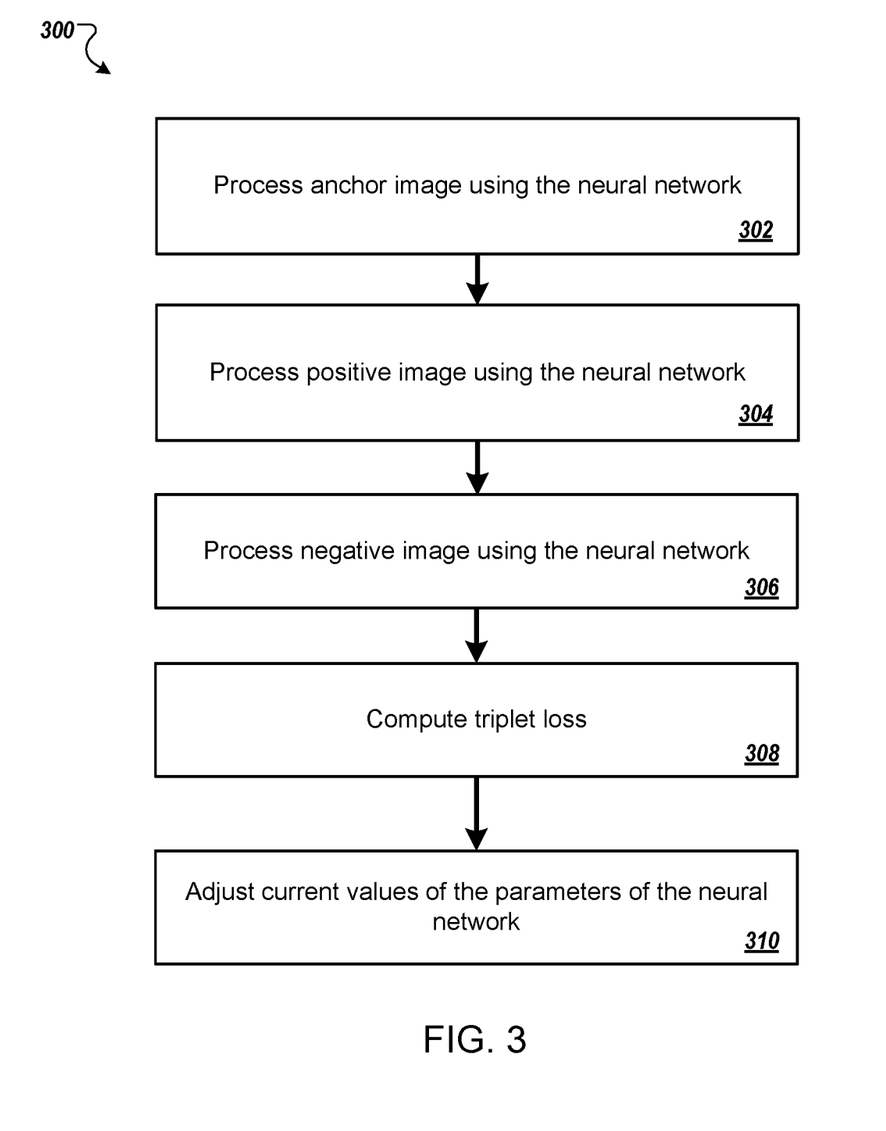
FIG. 3 is a flow diagram of an example process for training a neural network on a triplet.

FIG. 3 is a flow diagram of an example process 300 for training a neural network on a triplet. For convenience, the process 300 will be described as being performed by a system of one or more computers located in one or more locations. For example, a numeric embedding system, e.g., the numeric embedding system 100 of FIG. 1, appropriately programmed, can perform the process 300.

The system processes the anchor image in the triplet using the neural network in accordance with current values of the parameters of the neural network to generate a numeric embedding of the anchor image (step 302).

The system processes the positive image in the triplet using the neural network in accordance with the current values of the parameters of the neural network to generate a numeric embedding of the positive image (step 304).

The system processes the negative image in the triplet using the neural network in accordance with the current values of the parameters of the neural network to generate a numeric embedding of the negative image (step 306).

The system computes a triplet loss from the numeric embedding of the anchor image, the positive image, and the negative image (step 308). Generally, the triplet loss depends on the distance between the numeric embedding of the anchor image and the numeric embedding of the positive image and on the distance between the numeric embedding of the anchor image and the numeric embedding of the negative image.

For example, in some implementations, the triplet loss L satisfies:

$$L = \max(0, \|f(x^a) - f(x^p)\|_2^2 - \|f(x^a) - f(x^n)\|_2^2 + \alpha),$$

where $f(x^a)$ is the numeric embedding of the anchor image in the triplet, $f(x^p)$ is the numeric embedding of the positive image in the triplet, $f(x^n)$ is the numeric embedding of the negative image in the triplet, and $\alpha$ is a predetermined value greater than or equal to 0. Thus, the triplet loss is expressed such that it is minimized when an image of a specific object has an embedding that is closer to the embeddings of all other images of the specific object than it is to the embedding of any other image of any other object, with a margin between positive and negative pairs of at least a.

The system adjusts the current values of the parameters of the neural network using the triplet loss (step 310). That is, the system adjusts the current values of the parameters of the neural network to minimize the triplet loss. The system can adjust the current values of the parameters of the neural network using conventional neural network training techniques, e.g., stochastic gradient descent with backpropagation.

In some implementations, the set of triplets is the complete set of triplets to be used in training the neural network. In some other implementations, the system receives multiple batches of training images and, for each batch, generates a set of triplets from the training images in the batch and trains the neural network on the set of triplets as described above.

The system can generate a set of triplets from a batch of training images in any of variety of ways. Generally, the system processes each training image using the neural network to generate a respective numeric embedding of each image in accordance with the current values of the parameters of the neural network.

In some implementations, for a given image of a given object, the system generates a triplet with the given image as the anchor image, the image of the given object having the numeric embedding that is the farthest from the numeric embedding from the given image among all of the images of the given object in the batch as the positive image, and an image of an object different from the given object having the numeric embedding that is the closest to the numeric embedding of the given image among all of the images of objects other than the given object in the batch as the negative image.

In some other implementations, the system generates multiple triplets with the given image as the anchor image and the image of an object different from the given object having the numeric embedding that is the closest from the numeric embedding from the given image among all of the images of objects other than the given object in the batch as the negative image. That is, the system generates multiple triplets, each having the same anchor image and the same negative image, but with each having a different positive image.

In yet other implementations, the system generates multiple triplets with the given image as the anchor image by generating triplets such that the negative image in the triplet has a numeric embedding that is the closest to the numeric embedding of the given image among all of the possible negative images in the batch, i.e., all images in the batch that are of objects different from the given object, that have numeric embeddings that are farther from the numeric embedding of the given image than the numeric embedding of the positive image in the triplet is from the numeric embedding of the given image.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining a plurality of training images, wherein the training images have been classified as images of objects of a particular object type;
generating a plurality of triplets of training images, wherein each of the triplets comprises a respective anchor image, a respective positive image, and a respective negative image, and wherein, for each triplet, the anchor image and the positive image have both been classified as images of the same object of the particular object type and the negative image has been classified as an image of a different object of the particular object type; and
training a neural network on each of the triplets to determine trained values of a plurality of parameters of the neural network, wherein the neural network is configured to receive an input image of an object of the particular object type and to process the input image to generate a numeric embedding of the input image, wherein training the neural network comprises, for each of the triplets:
processing the anchor image in the triplet using the neural network in accordance with current values of the parameters of the neural network to generate a numeric embedding of the anchor image;
processing the positive image in the triplet using the neural network in accordance with the current values of the parameters of the neural network to generate a numeric embedding of the positive image;
processing the negative image in the triplet using the neural network in accordance with the current values of the parameters of the neural network to generate a numeric embedding of the negative image;
computing a triplet loss from the numeric embedding of the anchor image, the positive image, and the negative image; and
adjusting the current values of the parameters of the neural network to minimize the triplet loss such that distances between the numeric embedding of the input image of the object and respective numeric embeddings of other images of the same object is less than distances between the numeric embedding of the input image of the object and numeric embeddings of other images of other objects,
wherein generating the plurality of triplets of training images, includes, for each of the triplets, generating the triplet such that i) the numeric embedding of the positive image in the triplet is farther from the numeric embedding of the anchor image in the triplet than any other numeric embedding of any other image of the same object as in the positive image and the anchor image, and ii) the numeric embedding of the negative image in the triplet is closer to the numeric embedding of the anchor image than any other number embedding of any other image of a different object as in the positive image and the anchor image.

2. The method of claim 1, wherein the particular object type is faces of people.

3. The method of claim 1, wherein the neural network is a deep convolutional neural network.

4. The method of claim 1, wherein the neural network is configured to generate a vector of floating point values for the input image.

5. The method of claim 4, further comprising:
using the vector of floating point values as the numeric embedding of the input image.

6. The method of claim 4, further comprising:
normalizing the vector of floating point values to generate a normalized vector; and
using the normalized vector as the numeric embedding of the input image.

7. The method of claim 4, further comprising:
normalizing the vector of floating point values to generate a normalized vector;
quantizing the normalized vector to generate a quantized vector; and
using the quantized vector as the numeric embedding of the input image.

8. The method of claim 1, wherein the triplet loss satisfies, for each of the triplets:

$$L = \max(0, \|f(x^a) - f(x^p)\|_2^2 - \|f(x^a) - f(x^n)\|_2^2 + \alpha),$$

wherein f(x$^a$) is the numeric embedding of the anchor image in the triplet, f(x$^p$) is the numeric embedding of the positive image in the triplet, f(x$^n$) is the numeric embedding of the negative image in the triplet, and α is a predetermined value.

9. The method of claim 1, further comprising:
receiving a first image and a second image;
processing the first image using the neural network in accordance with the trained values of the parameters of the neural network to determine a numeric embedding of the first image;
processing the second image using the neural network in accordance with the trained values of the parameters of the neural network to determine a numeric embedding of the second image; and
determining whether the first image and the second image are images of the same object from a distance between the numeric embedding of the first image and the numeric embedding of the second image.

10. The method of claim 1, further comprising:
processing each of a plurality of images using the neural network in accordance with the trained values of the parameters of the neural network to determine a respective numeric embedding of each of the plurality of images;
receiving a new image;
processing the new image using the neural network in accordance with the trained values of the parameters of the neural network to determine a numeric embedding of the new image; and
classifying the new images as being an image of the same object as one or more of the plurality of images from distances between the numeric embedding of the new image and numeric embeddings of images from the plurality of images.

11. The method of claim 1, further comprising:
processing each of a plurality of images using the neural network in accordance with the trained values of the parameters of the neural network to determine a respective numeric embedding of each of the plurality of images;
clustering the numeric embedding of the plurality of images into a plurality of clusters; and
for each cluster, classifying the images having numeric embeddings that are in the cluster as being images of the same object.

12. A system comprising one or more computers and one or more storage devices storing instructions that, when executed by the one or more computers, cause the one or more computers to perform operations comprising:
obtaining a plurality of training images, wherein the training images have been classified as images of objects of a particular object type;
generating a plurality of triplets of training images, wherein each of the triplets comprises a respective anchor image, a respective positive image, and a respective negative image, and wherein, for each triplet, the anchor image and the positive image have both been classified as images of the same object of the particular object type and the negative image has been classified as an image of a different object of the particular object type; and
training a neural network on each of the triplets to determine trained values of a plurality of parameters of the neural network, wherein the neural network is configured to receive an input image of an object of the particular object type and to process the input image to generate a numeric embedding of the input image, wherein training the neural network comprises, for each of the triplets:
processing the anchor image in the triplet using the neural network in accordance with current values of the parameters of the neural network to generate a numeric embedding of the anchor image;
processing the positive image in the triplet using the neural network in accordance with the current values of the parameters of the neural network to generate a numeric embedding of the positive image;
processing the negative image in the triplet using the neural network in accordance with the current values of the parameters of the neural network to generate a numeric embedding of the negative image;
computing a triplet loss from the numeric embedding of the anchor image, the positive image, and the negative image; and
adjusting the current values of the parameters of the neural network to minimize the triplet loss such that distances between the numeric embedding of the input image of the object and respective numeric embeddings of other images of the same object is less than distances between the numeric embedding of the input image of the object and numeric embeddings of other images of other objects,
wherein generating the plurality of triplets of training images, includes, for each of the triplets, generating the triplet such that i) the numeric embedding of the positive image in the triplet is farther from the numeric embedding of the anchor image in the triplet than any other numeric embedding of any other image of the same object as in the positive image and the anchor image, and ii) the numeric embedding of the negative image in the triplet is closer to the numeric embedding of the anchor image than any other number embedding of any other image of a different object as in the positive image and the anchor image.

13. The system of claim 12, wherein the neural network is configured to generate a vector of floating point values for the input image.

14. The system of claim 12, wherein the triplet loss satisfies, for each of the triplets:

$$L = \max(0, \|f(x^a) - f(x^p)\|_2^2 - \|f(x^a) - f(x^n)\|_2^2 + \alpha),$$

wherein f(x$^a$) is the numeric embedding of the anchor image in the triplet, f(x$^p$) is the numeric embedding of the positive image in the triplet, f(x$^n$) is the numeric embedding of the negative image in the triplet, and α is a predetermined value.

15. The system of claim 12, the operations further comprising:
receiving a first image and a second image;
processing the first image using the neural network in accordance with the trained values of the parameters of the neural network to determine a numeric embedding of the first image;
processing the second image using the neural network in accordance with the trained values of the parameters of the neural network to determine a numeric embedding of the second image; and
determining whether the first image and the second image are images of the same object from a distance between the numeric embedding of the first image and the numeric embedding of the second image.

16. The system of claim 12, the operations further comprising:

processing each of a plurality of images using the neural network in accordance with the trained values of the parameters of the neural network to determine a respective numeric embedding of each of the plurality of images;

receiving a new image;

processing the new image using the neural network in accordance with the trained values of the parameters of the neural network to determine a numeric embedding of the new image; and classifying the new images as being an image of the same object as one or more of the plurality of images from distances between the numeric embedding of the new image and numeric embeddings of images from the plurality of images.

17. The system of claim 12, the operations further comprising:

processing each of a plurality of images using the neural network in accordance with the trained values of the parameters of the neural network to determine a respective numeric embedding of each of the plurality of images;

clustering the numeric embedding of the plurality of images into a plurality of clusters; and for each cluster, classifying the images having numeric embeddings that are in the cluster as being images of the same object.

18. A computer program product encoded on one or more non-transitory computer storage media, the computer program product comprising instructions that when executed by one or more computers cause the one or more computers to perform operations comprising:

obtaining a plurality of training images, wherein the training images have been classified as images of objects of a particular object type;

generating a plurality of triplets of training images, wherein each of the triplets comprises a respective anchor image, a respective positive image, and a respective negative image, and wherein, for each triplet, the anchor image and the positive image have both been classified as images of the same object of the particular object type and the negative image has been classified as an image of a different object of the particular object type; and training a neural network on each of the triplets to determine trained values of a plurality of parameters of the neural network, wherein the neural network is configured to receive an input image of an object of the particular object type and to process the input image to generate a numeric embedding of the input image, wherein training the neural network comprises, for each of the triplets:

processing the anchor image in the triplet using the neural network in accordance with current values of the parameters of the neural network to generate a numeric embedding of the anchor image;

processing the positive image in the triplet using the neural network in accordance with the current values of the parameters of the neural network to generate a numeric embedding of the positive image;

processing the negative image in the triplet using the neural network in accordance with the current values of the parameters of the neural network to generate a numeric embedding of the negative image;

computing a triplet loss from the numeric embedding of the anchor image, the positive image, and the negative image; and adjusting the current values of the parameters of the neural network to minimize the triplet loss such that distances between the numeric embedding of the input image of the object and respective numeric embeddings of other images of the same object is less than distances between the numeric embedding of the input image of the object and numeric embeddings of other images of other objects, wherein generating the plurality of triplets of training images, includes, for each of the triplets, generating the triplet such that i) the numeric embedding of the positive image in the triplet is farther from the numeric embedding of the anchor image in the triplet than any other numeric embedding of any other image of the same object as in the positive image and the anchor image, and ii) the numeric embedding of the negative image in the triplet is closer to the numeric embedding of the anchor image than any other number embedding of any other image of a different object as in the positive image and the anchor image.

* * * * *